US009996394B2

(12) United States Patent
Rossbach et al.

(10) Patent No.: US 9,996,394 B2
(45) Date of Patent: Jun. 12, 2018

(54) SCHEDULING ACCELERATOR TASKS ON ACCELERATORS USING GRAPHS

(75) Inventors: Christopher J. Rossbach, Menlo Park, CA (US); Jonathan James Currey, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 873 days.

(21) Appl. No.: 13/409,117

(22) Filed: Mar. 1, 2012

(65) Prior Publication Data
US 2013/0232495 A1 Sep. 5, 2013

(51) Int. Cl.
*G06F 9/50* (2006.01)
*G06F 9/46* (2006.01)

(52) U.S. Cl.
CPC .......... *G06F 9/5038* (2013.01); *G06F 9/5044* (2013.01); *G06F 2209/5021* (2013.01)

(58) Field of Classification Search
CPC . G06T 1/20; G06F 2209/5021; G06F 9/5038; G06F 9/5044; G09G 2360/06
See application file for complete search history.

(56) References Cited

U.S. PATENT DOCUMENTS

| | | | | |
|---|---|---|---|---|
| 6,269,390 B1 * | 7/2001 | Boland | | 718/100 |
| 7,598,953 B2 | 10/2009 | Tarditi, Jr. et al. | | |
| 7,623,936 B1 * | 11/2009 | Qu | | G05B 19/41865 700/101 |
| 7,659,901 B2 | 2/2010 | Toelle et al. | | |
| 8,122,451 B2 * | 2/2012 | McDonald | | G06F 9/4881 711/173 |
| 8,223,159 B1 * | 7/2012 | Diard | | G06T 1/20 345/502 |
| 8,286,170 B2 * | 10/2012 | Franaszek | | G06F 9/4881 718/1 |
| 2004/0160446 A1 * | 8/2004 | Gosalia et al. | | 345/503 |

(Continued)

OTHER PUBLICATIONS

Kato, et al., "RGEM: A Responsive Gpgpu Execution Model for Runtime Engines", Retrieved at <contrib.andrew.cmu.edu/~shinpei/papers/rtss11.pdf>>, Retrieved Date: Oct. 28, 2011, pp. 10.

(Continued)

*Primary Examiner* — James J Lee
(74) *Attorney, Agent, or Firm* — Jonathan M. Waldman

(57) ABSTRACT

An application programming interface is provided that allows programmers to encapsulate snippets of executable code of a program into accelerator tasks. A graph is generated with a node corresponding to each of the accelerator tasks with edges that represent the data flow and data dependencies between the accelerator tasks. The generated graph is used by a scheduler to schedule the execution of the accelerator tasks across multiple accelerators. The application programming interface further provides an abstraction of the various memories of the accelerators called a datablock. The programmer can store and use data stored on the datablocks without knowing where on the accelerators the data is stored. The application programming interface can further schedule the execution of accelerator tasks to minimize the amount of data that is copied to and from the accelerators based on the datablocks and the generated graph.

20 Claims, 8 Drawing Sheets

(56) References Cited

U.S. PATENT DOCUMENTS

| | | | |
|---|---|---|---|
| 2006/0227796 A1* | 10/2006 | Wei | H04L 12/5693 370/412 |
| 2006/0271606 A1* | 11/2006 | Tewksbary | 707/203 |
| 2007/0168754 A1* | 7/2007 | Zohar | G11B 20/1816 714/42 |
| 2007/0283358 A1* | 12/2007 | Kasahara | G06F 9/5044 718/104 |
| 2008/0276064 A1 | 11/2008 | Munshi et al. | |
| 2009/0007127 A1* | 1/2009 | Roberts et al. | 718/104 |
| 2009/0210876 A1* | 8/2009 | Shen | G06F 9/505 718/100 |
| 2009/0307699 A1* | 12/2009 | Munshi et al. | 718/102 |
| 2010/0214301 A1 | 8/2010 | Li et al. | |
| 2010/0257538 A1* | 10/2010 | Zhao et al. | 718/106 |
| 2010/0275213 A1* | 10/2010 | Sakai | G06F 9/5033 718/104 |
| 2011/0041127 A1* | 2/2011 | Kohlenz | G06F 9/4843 718/100 |
| 2011/0050713 A1 | 3/2011 | McCrary et al. | |
| 2011/0115802 A1 | 5/2011 | Mantor et al. | |
| 2011/0131580 A1* | 6/2011 | Krishnamurthy | G06F 9/5038 718/102 |
| 2011/0141122 A1 | 6/2011 | Hakura et al. | |
| 2011/0161620 A1* | 6/2011 | Kaminski | G06F 12/1009 711/207 |
| 2011/0173155 A1* | 7/2011 | Becchi | G06F 9/5044 707/610 |
| 2011/0285729 A1* | 11/2011 | Munshi et al. | 345/536 |
| 2013/0152099 A1* | 6/2013 | Bass | G06F 9/5027 718/103 |

OTHER PUBLICATIONS

Rossbach, et al., "Operating Systems must Support GPU Abstractions", Retrieved at <<usenix.org/events/hotos/tech/final_files/Rossbach.pdf>>, HotOS, May 9-11, 2011, pp. 1-5.

Baumann, et al., "The Multikernel: A New OS Architecture for Scalable Multicore Systems", Retrieved at <<sigops.org/sosp/sosp09/papers/baumann-sosp09.pdf>>, 22nd Symposium on Operating Systems Principles, Oct. 2009, pp. 1-20.

Currid, Andy., "TCP Offload to the Rescue", Retrieved at <<portal.acm.org/ft_gateway.cfm?id=1005069&type=pdf>>, ACM Queue, vol. 02, No. 3, May 2004, pp. 58-65.

Isard, et al., "Dryad: Distributed Data-Parallel Programs from Sequential Building Blocks", Retrieved at <<research.microsoft.com/en-us/projects/dryad/eurosys07.pdf>>, European Conference on Computer Systems (EuroSys), Mar. 21-23, 2007, pp. 14.

Kato, et al., "TimeGraph: GPU Scheduling for Real-Time Multi-Tasking Environments", Retrieved at <<static.usenix.org/event/atc11/tech/final_files/Kato.pdf>>, In Proceedings of the 2011 USENIX Annual Technical Conference (USENIX ATC), 2011, pp. 14.

Massalin, et al., "Threads and Input/Output in the Synthesis Kernel", Retrieved at <<www.cs.princeton.edu/courses/archive/fall03/cs518/papers/synthesis.pdf>>, In Proceedings of the 12th ACM Symposium on Operating Systems Principles, 1989, pp. 191-201.

Nightingale, et al., "Helios: Heterogeneous Multiprocessing with Satellite Kernels", Retrieved at <citeseerx.ist.psu.edu/viewdoc/download?doi=10.1.1.149.6781&rep=rep1&type=pdf>>, Proceedings of the 22nd ACM Symposium on Operating Systems Principles, SOSP, Oct. 11-14, 2009, pp. 14.

Papadopoulos, et al., "Monsoon: An Explicit Token-Store Architecture", Retrieved at <citeseerx.ist.psu.edu/viewdoc/download-?doi=10.1.1.124.1645&rep=rep1&type=pdf>>, In Proceedings of the 17th Annual International Symposium on Computer Architecture, 1990, pp. 82-91.

Thies, et al., "StreamIt: A Language for Streaming Applications", Retrieved at <<people.csail.mit.edu/thies/streamit-cc.pdf>>, Compiler Construction, 11th International Conference, CC, Held as Part of the Joint European Conferences on Theory and Practice of Software, ETAPS, Apr. 8-12, 2002, pp. 1-17.

Weinsberg, et al., "Tapping Into the Fountain of CPUs: On Operating System Support for Programmable Devices", Retrieved at <<.cs.huji.ac.il/~dolev/pubs/aspolos08-yaron--selfcopy.pdf>>, Proceedings of the 13th International Conference on Architectural Support for Programming Languages and Operating Systems, Asplos, Mar. 1-5, 2008, pp. 10.

Gupta, et al., "Pegasus: Coordinated Scheduling for Virtualized Accelerator-based Systems", Retrieved at <<usenix.org/event/atc11/tech/final_files/Gupta.pdf>>, In Proceedings of the 2011 Usenix Annual Technical Conference, Jun. 2011, pp. 14.

* cited by examiner

700

800

SCHEDULING ACCELERATOR TASKS ON ACCELERATORS USING GRAPHS

BACKGROUND

Accelerators, such as graphics processing units (GPUs), have surpassed computer processing units (CPUs) as a source of high-density computing resources. The proliferation of fast GPU hardware has been accompanied by the emergence of general purpose GPU (GPGPU) frameworks, enabling programmers to write high-performance code for GPU hardware. However, despite the success of GPUs in supercomputing environments, GPU hardware and programming environments are not routinely integrated into many other types of systems because of programming difficulty, lack of modularity, and unpredictable performance artifacts.

Current systems for programming GPUs rely on vendor-provided tools that require programmers to write code that explicitly controls the movement of data to and from the GPU, in addition to providing the code that runs on the GPU itself. Because of this explicit control of data movement, programmers using these systems sacrifice either performance, or modularity and reusability. Coupling of data movement code with algorithm code is also a barrier to providing higher-level programming environments.

SUMMARY

An application programming interface is provided that allows programmers to encapsulate snippets of executable code of a program into accelerator tasks. A graph is generated with a node corresponding to each of the accelerator tasks with edges that represent the data flow and data dependencies between the accelerator tasks. The generated graph is used by a scheduler to schedule the execution of the accelerator tasks across multiple accelerators. The application programming interface further provides an abstraction of the various memories of the accelerators called a datablock. The programmer can store and use data stored on the datablocks without knowing where on the accelerators the data is stored. The application programming interface can further schedule the execution of accelerator tasks to minimize the amount of data that is copied to and from the accelerators based on the datablocks and the generated graph.

In an implementation, accelerator tasks are received at a computing device. Each accelerator task has an associated set of accelerator parameters. Identifiers of a plurality of accelerators are received at the computing device. Identifiers of one or more available accelerators are received at the computing device. Identifiers of a plurality of datablocks are received at the computing device. A ready accelerator task of the accelerator tasks is determined by the computing device. One or more accelerators from the identified available accelerators that support the set of accelerator parameters associated with the determined ready accelerator task are determined by the computing device. The ready accelerator task is provided to one of the determined accelerators by the computing device. One or more datablocks that are associated with the provided accelerator task are determined by the computing device. Identified data is copied from the determined datablocks to the determined accelerator. At least one result is received by the computing device.

In an implementation, each accelerator task includes at least one data output and at least one data input. A graph is generated based on the accelerator tasks. The graph includes a node for each of the accelerator tasks, and edges between pairs of nodes corresponding to accelerator task pairs where a data output of a first accelerator task in the pair is a data input of a second accelerator task in the pair. Identifiers of accelerators are received at the computing device. The execution of the accelerator tasks on the identified accelerators is scheduled according to the generated graph. At least one result of the execution of the accelerator tasks is received by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
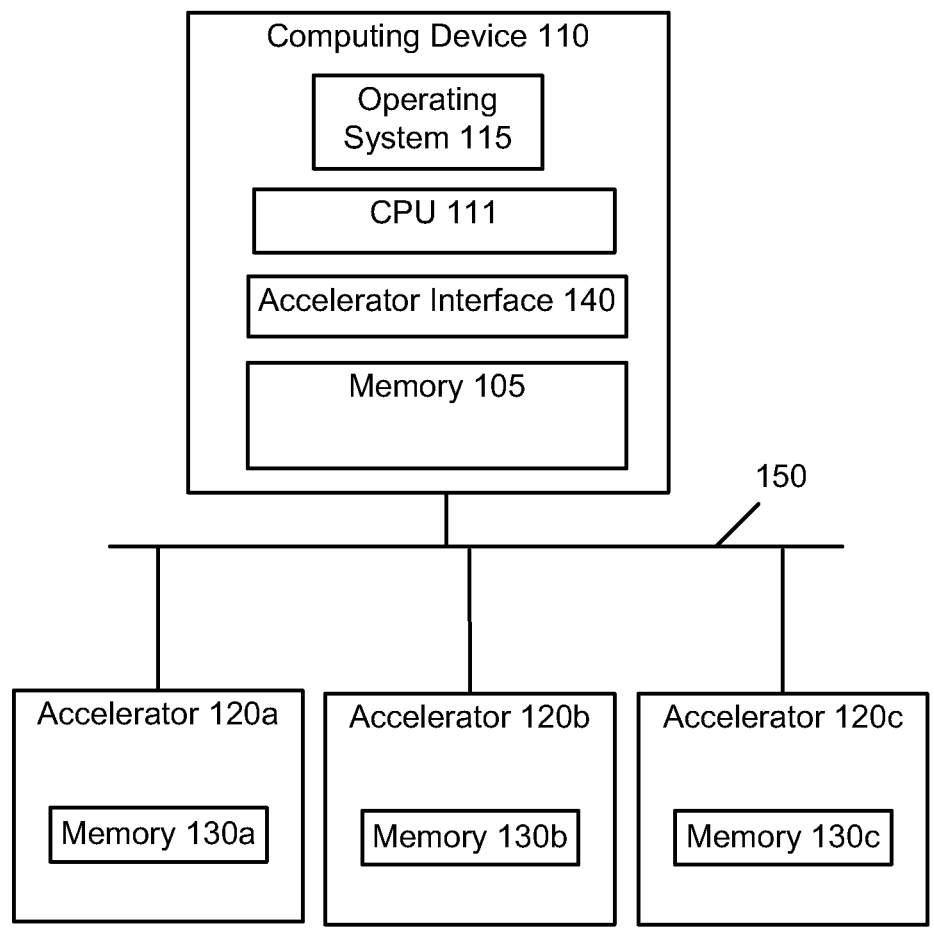
FIG. 1 shows an example of a computing environment for scheduling and managing accelerator tasks on one or more accelerators.

FIG. 1 shows an example of a computing environment 100 for scheduling and managing accelerator tasks on one or more accelerators. The environment 100 may include a computing device 110 coupled to one or more accelerators 120a, 120b, and 120c. The computing device 110 may be coupled to the accelerators 120a, 120b, and 120c through a bus 150; however, other types of connectors may be used. While shown as being separate from the computing device 110 in the environment 100, in some implementations the accelerators 120a-c may be components of the computing device 110.

The computing device 110 may have a central processing unit (CPU) 111 and memory 105. The computing device 110 may further execute an operating system 115 that may control and schedule the execution of one or more processes on the CPU 111, and may control and manage the usage of the memory 105 by the one or more processes. The computing device 110 may be implemented using a general purpose computing device such at the computing device 1000 illustrated with respect to FIG. 10.

The accelerators 120a-c may be specialized processors or circuits that are designed for a particular task or application. Each of the accelerators 120a-c may have its own memory as illustrated by memories 130a, 130b, and 130c, respectively. Examples of accelerators 120a-c may include GPUs and field-programmable gate arrays (FPGAs). Other types of accelerators 120a-c may also be used. While three accelerators 120a-c are shown, it is for illustrative purposes only; more or fewer accelerators may be supported by the environment 100. The accelerators 120a-c may be implemented by the accelerator 1003 illustrated with respect to FIG. 10.

As described above, one drawback associated with accelerators 120a-c is that there is no operating system 115 level support that allows programmers to easily take advantage of the processing power of the accelerators 120a-c, and that provides the same guarantees of fairness and performance isolation that is provided by the operating system 115 to the processes executing on the CPU 111. Accordingly, the computing device 110 includes an accelerator interface 140 that provides a programming model that allows programmers to execute existing applications or programs on the accelerators 120a-c, as well as provides fairness and performance isolation with respect to the programs executing on the accelerators 120a-c.

In some implementations, the accelerator interface 140 may expose an application programming interface that provides a dataflow programming model in which a programmer writes code to manage a graph structured computation. The graph may be a directed acyclic graph or a cyclic graph, and may include a plurality of nodes connected by a plurality of edges. Each node in the graph may represent what is referred to herein as an accelerator task. The edges in the graph may represent dataflow between the accelerator tasks associated with each node. Each accelerator task may receive data from one or more edges through what is referred to herein as a data input. Each accelerator task may further provide data to one or more edges through what is referred to herein as a data output.

In some implementations, units of data that flow along the edges of a graph may be represented by datablocks. Each datablock may include pointers that map the datablocks to one or more locations in the separate memories 105, 130a, 130b, and 130c.

Figure 2:
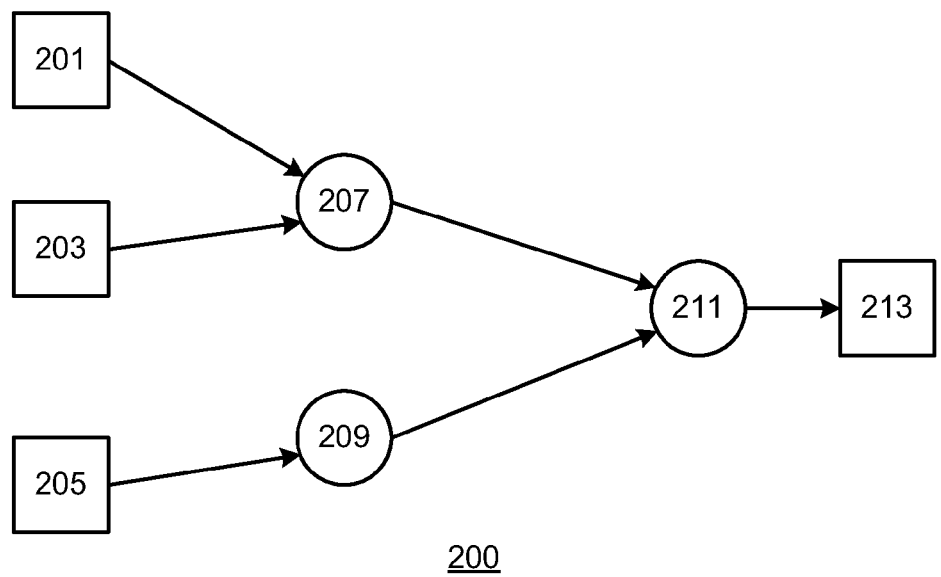
FIG. 2 is an illustration of an example graph.

For example, FIG. 2 is an illustration of an example graph 200. The graph includes nodes 207, 209, and 211 that each represent an accelerator task. The graph 200 further includes datablocks 201, 203, 205, and 213 that represent data sources and data sinks used by the accelerator tasks associated with the nodes 207, 209, and 211 of the graph 200.

As expressed by the directed edges connecting the nodes and the datablocks of the graph 200, the accelerator task represented by the node 207 uses data provided by the datablocks 201 and 203, and the accelerator task represented by the node 209 uses data provided by the datablock 205. The accelerator task represented by the node 211 uses data provided by the accelerator tasks represented by the nodes 207 and 209, and outputs data that is stored as the datablock 213.

As may be appreciated, the graph 200 provides information about dataflow and concurrency that may be used by the accelerator interface 140 to schedule the execution of the accelerator tasks on the accelerators 120a-c. For example, with respect to scheduling, the graph 200 shows that the accelerator tasks associated with the nodes 207 and 209 may be executed at the same time by an accelerator, while the accelerator task associated with the node 211 may not be executed until the other tasks have been completed because it uses data provided by each task. Thus, the accelerator interface 140 may execute the accelerator tasks associated with the nodes 207 and 209 in parallel on the accelerators 120a and 120b, and after both tasks have completed, may execute the accelerator task associated with the node 211 on any of the accelerators 120a-c.

With respect to dataflow, the graph 200 shows that the accelerator task associated with the node 211 uses data that is produced from the accelerator tasks associated with the nodes 207 and 209. Thus, to minimize the amount of data that is copied between the accelerators 120a-c and the computing device 110, the accelerator interface 140 may select an accelerator 120a-c that executed one of the accelerator tasks associated with the nodes 207 or 209 to execute the task associated with the node 211.

A programmer or other user may use the accelerator interface 140 to generate one or more accelerator tasks from existing code corresponding to a program or application that the programmer would like to execute on the accelerators 120a-c. Each accelerator task may correspond to a portion or snippet of code from the applications.

For each accelerator task, the programmer may replace memory operations with data inputs or outputs that read or write data to one or more datablocks. A datablock may be an abstraction of the memories 130a-130c, as well as the memory 105, and each datablock may have a pointer to one or more corresponding buffers on one or more of the memories 130a-c and 105. When executing an accelerator task at a particular accelerator 120a-c, the accelerator interface 140 may ensure that a current version of the data associated with a datablock used by the accelerator task is in a buffer at the particular accelerator 120a-c. By abstracting the memory operations using datablocks, programmers no longer have to be concerned with copying data among the accelerators 120a-c or the computing device 110.

After adding the data inputs and data outputs to the accelerator tasks, the programmer may generate a graph from the accelerator tasks by connecting the various data inputs and data outputs of the accelerator tasks with directed edges. For example, if a first accelerator task has a data input that reads from a datablock that is written to by a data output of a second accelerator task, the programmer may add a directed edge that connects the data output of a node that represents the second accelerator task with a data input of a node that represents the first accelerator task. The graph may show the data dependencies among the accelerator tasks and may be used by the accelerator interface 140 to schedule the accelerator task for execution on the accelerators 120a-c.

Figure 3:
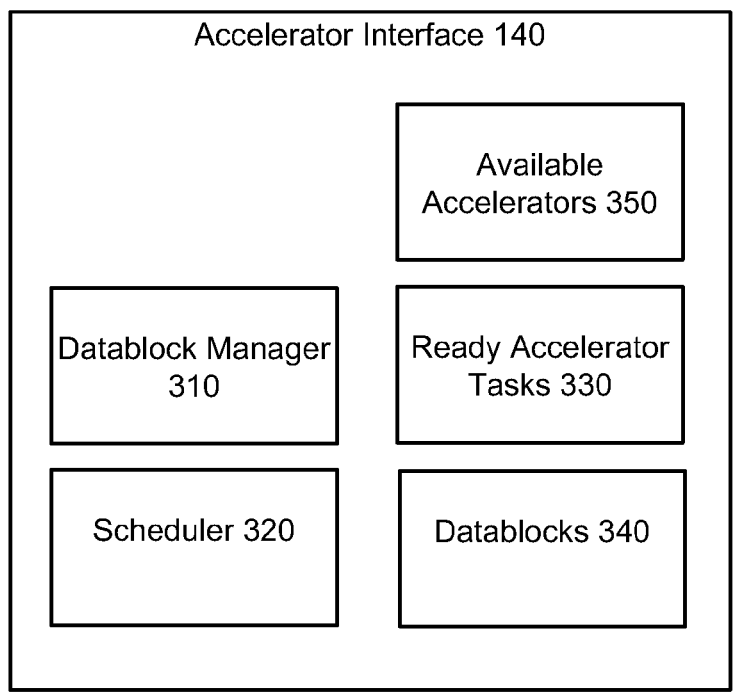
FIG. 3 is an illustration of an example accelerator interface.

FIG. 3 is an illustration of an example accelerator interface 140. As shown, the accelerator interface 140 may include a data block manager 310 and a scheduler 320. More or fewer components may be supported.

The datablock manager 310 may manage and track the locations of one or more datablocks 340 among the memories of the computing device 110 and the accelerators 120a-c (e.g., the memories 105, and 130a-c). As described above, a datablock is a memory abstraction that may refer to multiple locations in the memories 130a, 130b, 130c, and the memory 105.

In some implementations, each datablock of the datablocks 340 may include one or more pointers to one or memory locations that are associated with the datablock. The memory locations may include buffers. A datablock may be implemented as a logical buffer with a corresponding physical buffer at one or more of the memories of the computing device 110 and the accelerators 120a-c. The logical buffer may be implemented by the aggregation of many physical buffers which need not be contiguous. The datablock manager 310 may copy data among the one or more memory locations based on the data flow described by a graph. In some implementations, each datablock 340 may also include an indicator of which memory location includes the most current version of the data. Each datablock 340 may further indicate which memory locations are writable, readable, or contain valid data.

Figure 4:
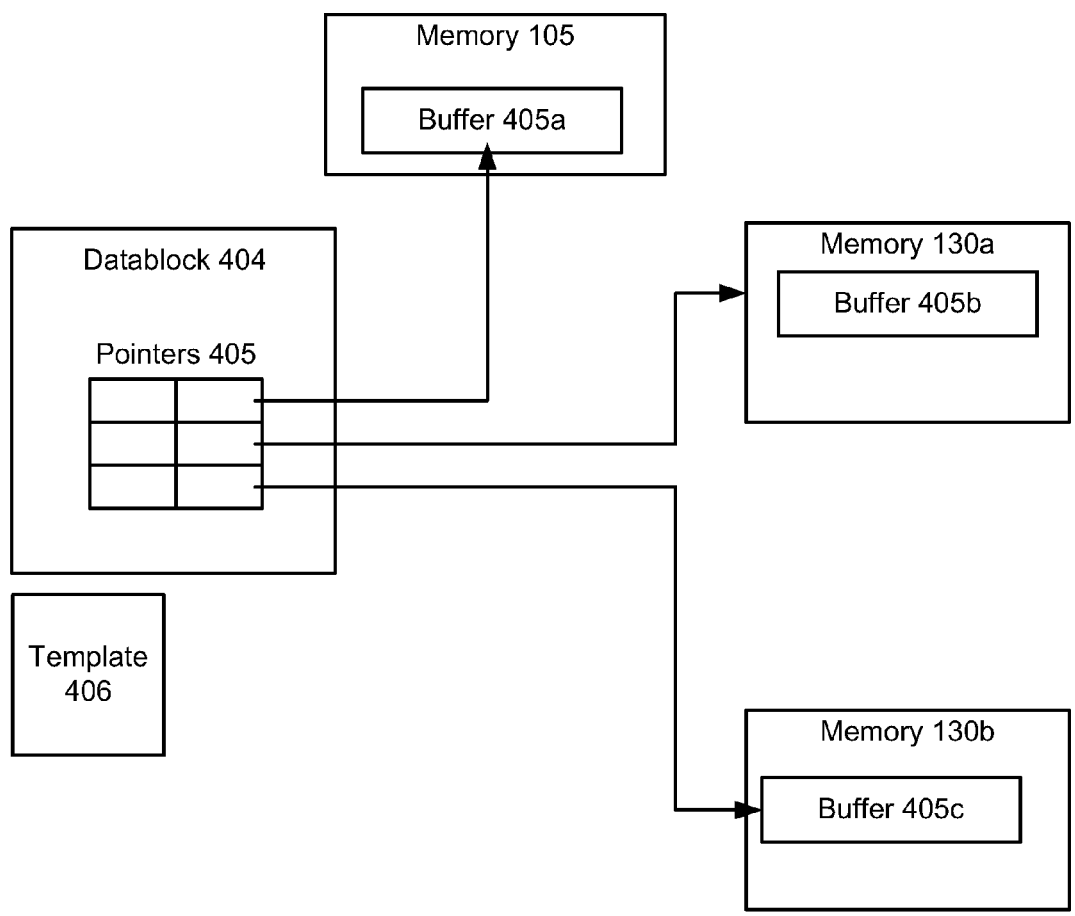
FIG. 4 is an illustration of an example datablock.

For example, FIG. 4 shows an example datablock 404 that may be managed by the datablock manager 310. The datablock 404 includes pointers 405 that each point to buffers of the various memories that include data associated with the datablock 404. As illustrated, a buffer 405a of the memory 105, a buffer 405b of the memory 130a, and a buffer 405c of memory 130b may each store data associated with the datablock 404.

When one of the accelerators 120a-c, or the computing device 110, begins executing a particular accelerator task associated with a node in a graph, the datablock manager 310 may determine which datablocks 340 are used by the accelerator task. The datablock manager 310 may then ensure that a buffer exists in the memory of the accelerator 120a-c that will execute the accelerator task for each datablock 340 used by the accelerator task. The datablock manager 310 may further ensure that the buffer for each datablock 340 has the most current version of the data associated with each datablock 340. If a buffer does not have the most current version of a datablock 340, then the datablock manager 310 may copy the most current version of the datablock to the buffer.

For example, with respect to FIG. 2, the accelerator task corresponding to the node 207 may begin executing on the accelerator 120a. As shown, the accelerator task uses data from the datablock 201 and the datablock 203. Accordingly, before the accelerator 120a begins executing the accelerator task, the datablock manager 310 may determine if current versions of the data associated with the datablocks 201 and 203 are stored in buffers in the memory 130a of the accelerator 120a, and if not, the datablock manager 310 may copy the current versions of the data to buffers in the memory 130a of the accelerator 120a. The datablock manager 310 may then update the pointers and/or indicators associated with the datablocks 201 and 203, and may allow the accelerator 120a to begin executing the accelerator task.

In some implementations, the datablock 404 may further be associated with a template 406. A template 406 may comprise metadata that describes the data stored in each of the buffers associated with the datablock. In some implementations, the template 406 may include the dimensions of the data in the buffers as well as data that indicate whether the data may be treated as an array of fixed elements, a stream of variable sized elements, or as an opaque byte array, for example.

In some implementations, the data block manager 310 may wait to copy data associated with a datablock from one buffer to another buffer until the data is needed to execute an accelerator task. In other implementations, the data block manager 310 may determine when to copy data based on a graph or based on run-time profiling of patterns of memory accesses. For example, the data block manager 310 may determine that an accelerator task that uses a particular datablock will likely be executed at the accelerator 120b. Accordingly, the datablock manager 310 may copy the data associated with the datablock to a buffer in the memory 130b associated with the accelerator 120b.

The scheduler 320 may schedule and coordinate the execution of one or more ready accelerator tasks 330 among the accelerators 120a-c, and/or the CPU 111. The scheduler 320 may identify an accelerator task as ready when the accelerator task is not waiting for a datablock to be updated or for a data value to be generated by another accelerator task. In some implementations, the scheduler 320 may determine ready accelerator tasks based on a graph.

For example, with respect to the graph 200, the scheduler 320 may determine that accelerator task associated with the node 207 is ready to execute when the datablocks 201 and 203 are available. The scheduler 320 may determine that the accelerator task associated with the node 209 is ready to execute when the datablock 205 is ready. The scheduler 320 may determine that accelerator task associated with the node 211 is ready to execute after the accelerator tasks associated with the nodes 207 and 209 have completed.

In some implementations, when an accelerator task is identified as ready, the scheduler 320 may add the accelerator task to the ready accelerator tasks 330. The ready accelerator tasks 330 may be a queue. However, other data structures may be used.

The scheduler 320 may further maintain available accelerators 350. The available accelerators 350 may comprise a list or queue of identifiers of accelerators 120a-c that are not currently executing an accelerator task. When an accelerator finishes executing an accelerator task, the scheduler 320 may add an identifier of the available accelerator to the available accelerators 350.

In some implementations, each accelerator identified in the available accelerators 350 may have what is referred to herein as an associated strength. The strength of an accelerator may be a measure of the performance capabilities of the accelerator and may be based on the number of cores, an amount of memory, a clock speed of the memory or cores associated with the accelerator, a highest runtime version support, support for concurrent kernels, and/or an enumeration order, for example. Other performance indicators may be used to calculate the strength of the accelerator 350.

Each of the ready accelerator tasks 330 may have an associated priority. In some implementations, the priority of an accelerator task may be based on the priority of a requesting process associated with the accelerator task. In other implementations, the priority of an accelerator task may be calculated by the scheduler 320 based on a weighted sum of a variety of factors including one or more of a current wait time of the accelerator task, an average wait time of the accelerator task, an average run time of the accelerator task, and the current priority of the accelerator task, for example. In general, the weights may be selected such that the priority of an accelerator task increases if the accelerator task has longer than average wait time, and a lower than average run time. In some implementations, the scheduler 320 may calculate the priority for an accelerator task when it is added to the ready accelerator tasks 330.

Each accelerator task in the ready accelerator tasks 330 may further have a set of associated accelerator parameters. The set of accelerator parameters may specify the requirements that an accelerator 120a-c may have in order to execute the accelerator task. The set of accelerator parameters may specify the amount or memory, number of cores, and other parameters of the accelerators 120a-c. In an implementation, the set of accelerator parameters may be related to the accelerator strength described above.

The scheduler 320 may select an accelerator task from the ready accelerator tasks 330, and an accelerator 120a-c from the available accelerators 350, and may provide the selected accelerator task for execution on the selected accelerator 120a-c. The scheduler 320 may select the accelerator task and accelerator using a variety of scheduling algorithms including first-available, FIFO (first in, first out), priority, and data-aware, for example.

In FIFO scheduling, the scheduler 320 may select the accelerator task that has been in the ready accelerator tasks 330 the longest. In first-available scheduling, the scheduler 320 may schedule any accelerator task that is available from the ready accelerator tasks 330 without regard to the order that they were added to the ready accelerator tasks 330. In priority scheduling, the scheduler 320 may select the accelerator task from the ready accelerator tasks 330 with the greatest associated priority.

After selecting the accelerator task, the scheduler 320 may determine an accelerator 120a-c of the available accelerators 350 that can support the selected accelerator task as determined by the accelerator parameters associated with the selected accelerator task. If multiple accelerators 120a-c of the available accelerators 350 can support the accelerator task, then the scheduler 320 may select from the available accelerators 350 using one of a variety of accelerator 120a-c selection techniques.

In some implementations, the scheduler 320 may select the available accelerator 350 with the greatest strength. Alternatively, the scheduler 320 may select the available accelerator 350 that has been idle for the greatest amount of time, or by using a technique such as round-robin scheduling. In some implementations, each accelerator task may have an affinity towards a particular accelerator. The scheduler 320 may select the available accelerator 350 based on the affinity of the selected accelerator task.

If there is no available accelerator 350 that can support the set of accelerator parameters associated with the selected accelerator task, then the scheduler 320 may select another accelerator task from the ready accelerator tasks 330. For example, where priority scheduling is used, the scheduler 320 may select the accelerator task from the ready accelerator tasks 330 with the next highest priority. If no suitable accelerator from the available accelerators 350 can execute an accelerator task from the ready accelerator tasks 330, then the scheduler 320 may block until either an accelerator task with a less stringent set of accelerator parameters is added to the ready accelerator tasks 330, or an accelerator 120a-c with sufficient strength is added to the available accelerators 350.

In some implementations, rather than select the available accelerator with the greatest strength, or other criteria, from the available accelerators 350 to execute a selected accelerator task, the scheduler 320 may select the available accelerator using what is referred to herein as data aware scheduling. Using data aware scheduling, the scheduler 320 may consider the locations of the data or datablocks that the selected accelerator task uses when selecting an accelerator. The scheduler 320 may select the accelerator from the available accelerators 350 that minimizes the amount of data that is copied to the selected accelerator.

For example, with respect to FIG. 2, the scheduler 320 may be selecting an available accelerator to execute the accelerator task associated with the node 211. The accelerator 120a and the accelerator 120b may both be identified in the available accelerators 350. The accelerator 120a may have just completed executing the accelerator task associated with the node 207. As shown, the accelerator task associated with the node 211 uses data from the execution of the accelerator tasks associated with the nodes 207 and 209. Accordingly, the scheduler 320 may select the accelerator 120a to execute the selected accelerator task, because the data that was generated by the accelerator task associated with the node 207 is already at the accelerator 120a from the previous execution and only data from the execution of the accelerator task associated with the node 209 may be copied to the accelerator 120a by the datablock manager 310. In contrast, if the scheduler 320 selected the accelerator 120b for executing the selected accelerator task, the datablock manager 310 may copy the data from the execution of the accelerator tasks associated with both of the nodes 207 and 209.

In some implementations, the scheduler may schedule accelerator tasks using information stored in one or more templates 406. The scheduler 320 may infer how many hardware threads are needed to execute a scheduled accelerator task based on a template 406. Providing such information in a template allows the runtime to infer how many hardware threads to use for each accelerator task, with the benefit that the programmer need no longer specify this information explicitly.

Figure 5:
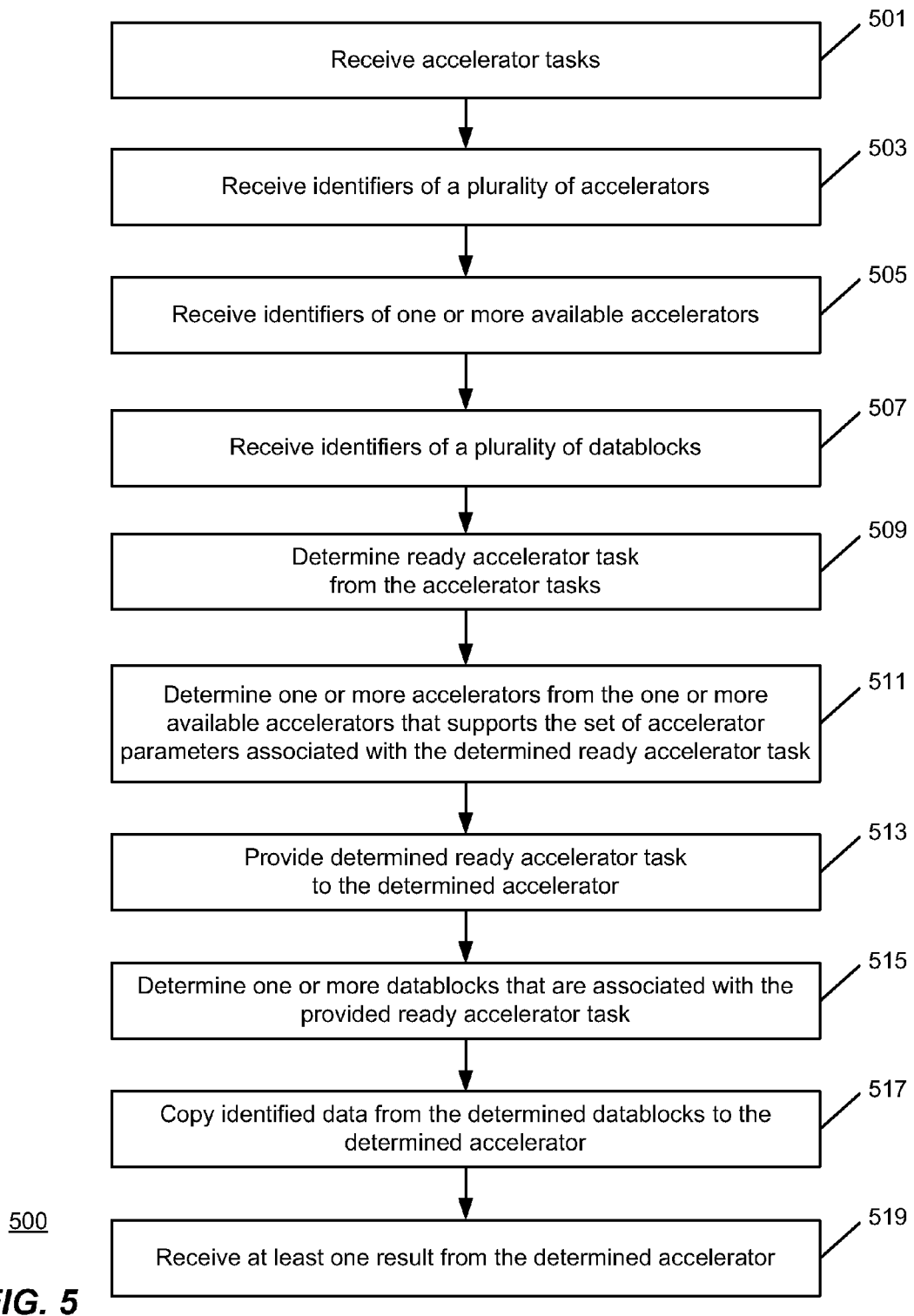
FIG. 5 is an operational flow of an implementation of a method for executing accelerator tasks by one or more accelerators.

FIG. 5 is an illustration of an exemplary method 500 for executing a plurality of accelerator tasks by one or more accelerators. The method 500 may be implemented by the accelerator interface 140, for example.

A plurality of accelerator tasks is received at 501. The accelerator tasks may be received by the accelerator interface 140 of a computing device 110. In some implementations, each accelerator task has an associated set of accelerator parameters. The set of accelerator parameters may specify performance characteristics that an accelerator 120a-c may support to execute the associated accelerator task.

In some implementations, the accelerator tasks may be received as part of an accelerator task graph. The graph may be a directed acyclic graph or a cyclic graph and may show data flow between the various accelerator tasks as well as concurrency. The graph may include a node for each accelerator task and directed edges that represent data flow between the accelerator tasks associated with the nodes. A programmer may have used the accelerator interface 140 to generate the graph.

Identifiers of a plurality of accelerators are received at 503. The identifiers of the accelerators 120a-c may be received by the accelerator interface 140 of the computing device 110. The accelerators 120a-c may be any type of accelerator such as a GPU or a FPGA. In some implementations, each accelerator 120a-c may have an associated strength that is based on performance characteristics of the accelerator 120a-c (e.g., number and speed of cores, and amount and speed of memory).

Identifiers of one or more available accelerators from the plurality of accelerators are received at 505. The identifiers may be received by the scheduler 320 of the accelerator interface 140. The identifiers may be of the available accelerators 350. The available accelerators 350 may be the accelerators 120a-c that are available to execute an accelerator task.

Identifiers of a plurality of datablocks may be received at 507. The identifiers of datablocks may be received by the datablock manager 310 of the accelerator interface 140. Each datablock may identify data located at buffers in the memories of one or more of the available accelerators.

A ready accelerator task from the plurality of accelerator tasks is determined at 509. A ready accelerator task may be determined by the scheduler 320 of the accelerator interface 140. In some implementations, the ready accelerator task may be determined by the scheduler 320 from a queue such as the ready accelerator tasks 330. Depending on the implementation, the scheduler 320 may select the first ready accelerator task, or may select the ready accelerator task with the greatest associated priority.

One or more accelerators from the identified one or more available accelerators that supports the set of accelerator parameters associated with the determined ready accelerator task is determined at 511. The accelerator may be determined by the scheduler 320. If multiple accelerators 120a-c support the set of accelerator parameters, then the scheduler 320 may select the accelerator 120a-c with the greatest associated strength. Alternatively, the accelerator 120a-c that uses the least amount of data transfer by the datablock manager 310 may be selected. For example, the scheduler 320 may determine a datablock of the received identifiers of datablocks that is associated with the ready accelerator task, and may select an accelerator that includes data identified by the determined datablock.

The determined ready accelerator task is provided to the determined available accelerator at 513. The accelerator task may be provided by the accelerator interface 140 to the determined accelerator 120a-c. The determined available accelerator may then execute the determined task.

One or more datablocks that are associated with the provided ready accelerator task is determined at 515. The one or more datablocks may be of the identified datablocks and may be determined by the datablock manager 310.

Identified data from the determined datablocks is copied to the determined accelerator at 517. The identified data may be copied to a buffer on the determined accelerator by the datablock manager 310. In some implementations, the identified data may only be copied to the determined accelerator if the determined accelerator does not already have a most current version of the identified data.

At least one result is received from the determined accelerator at 519. The at least one result may be received by the operating system 115 from the accelerator interface 140.

Figure 6:
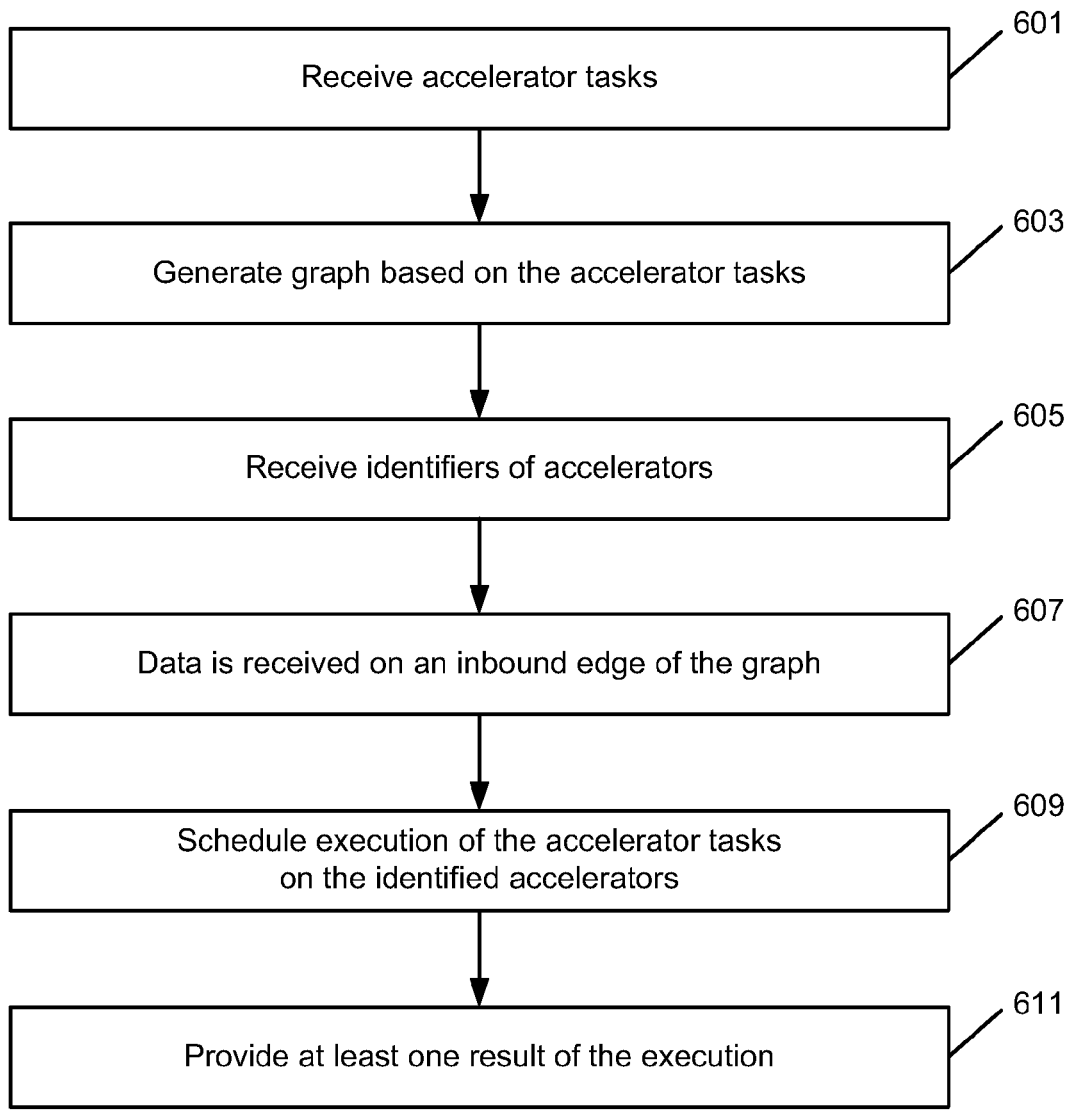
FIG. 6 is an operational flow of an implementation of a method for scheduling the execution of accelerator tasks on one or more accelerators.

FIG. 6 is an illustration of an exemplary method 600 for scheduling the execution of a plurality of accelerator tasks on one or more accelerators. The method 600 may be implemented by the accelerator interface 140, for example.

A plurality of accelerator tasks is received at 601. The plurality of accelerator tasks may be received by the accelerator interface 140. The plurality of accelerator tasks may correspond to portions of code from an application or program.

A graph is generated based on the accelerator tasks at 603. The graph may be generated by the accelerator interface 140. In some implementations, the graph includes a node for each of the accelerator tasks, and edges between pairs of nodes correspond to accelerator task pairs, where a data output of a first accelerator task in the pair is a data input of a second accelerator task in the pair. Alternatively or additionally, an edge may indicate that the second accelerator task in the pair uses an attribute or parameter from the execution of the first accelerator task. The graph may be a directed acyclic or a cyclic graph. The graph may be generated automatically, or may be provided by a user or programmer.

Identifiers of a plurality of accelerators are received at 605. The identifiers of a plurality of accelerators may be received by the scheduler 320 of the accelerator interface 140. The plurality of accelerators may be GPUs or FPGAs, for example.

Data is received on an inbound edge of the graph at 607. The data may be associated with one or more datablocks, and may be received by the datablock manager 310.

The execution of the plurality of accelerator tasks is scheduled on the identified plurality of accelerators at 609. The execution of the accelerator tasks may be scheduled by the scheduler 320 of the accelerator interface 140 based on the generated graph and the received data. By scheduling the accelerator tasks by the scheduler 320, programmers can generate applications without knowing the exact number of accelerators present on each user system.

The execution of the accelerator tasks may be scheduled using one or more of first-available, FIFO, priority, and data-aware scheduling. Other methods of scheduling may be used. The scheduler 320 may further schedule which of the plurality of accelerators execute the scheduled accelerator tasks. In addition, the scheduler 320 may schedule the CPU to execute one or more of the scheduled accelerator tasks if the plurality of accelerators is unavailable. The scheduler 320 may schedule the accelerator tasks based on latency associated with one or more of the plurality of accelerators, or based on accelerator parameters associated with each of the accelerator tasks.

At least one result of the execution is provided at 611. The at least one result of the execution may be provided by the accelerator interface 140 to the operating system 115.

Figure 7:
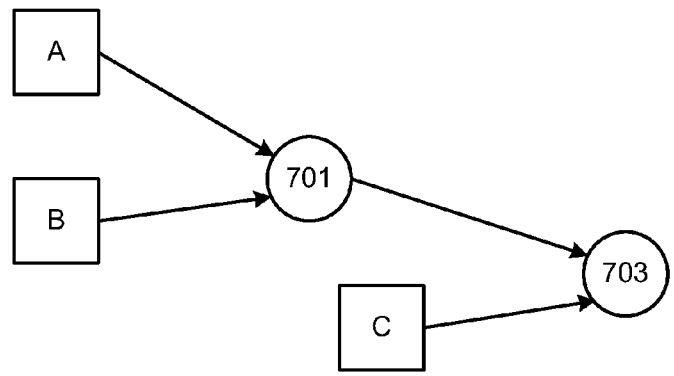
FIG. 7 is an illustration of an example graph representing a program that performs a matrix multiplication computation.

FIG. 7 is an illustration of an example graph 700 representing a program that performs the matrix multiplication computation ((A×B)×C). The variables for matrices A, B, and C are represented in the graph 700 as the datablocks A, B, and C. An accelerator task that performs the multiplication of the matrices A and B is represented by a node 701, and an application task that represents the multiplication of ((A×B)×C) is represented by a node 703. At run-time, the datablocks A and B may be pushed by the application interface 140 into input channels represented by the edges from the datablocks A and B to the node 701, causing the application task associated with the node 701 to be executed by an accelerator 120a-c. After that application task completes, the result of the multiplication of (A×B) is pushed into an internal channel represented by the edge between the node 701 and 703, causing the datablock C to be pulled into the input channel represented by the edge between the datablock C and the node 703. One or more templates associated with the datablocks A, B, and C, which are not shown, may provide metadata describing the memory layout of the matrices A, B, and C.

By decoupling data flow from the algorithm used by the accelerator tasks, difficult tradeoffs between modularity and performance are eliminated because the data-aware scheduling used by the datablock manager 310 may avoid unnecessary data movement. The programmer expresses the structure of the computation in the graph 700 and the datablock manager 310 of the accelerator interface 140 moves data among the memories of the accelerators 120a-c and the computing device 110 on an as-needed basis. For example, from the graph 700, the datablock manager 310 may recognize that the intermediate result (A×B) may be both produced and consumed by the same accelerator, so it can avoid moving that intermediate result to and from memories of other accelerators or of the computing device 110 at run-time.

Figure 8:
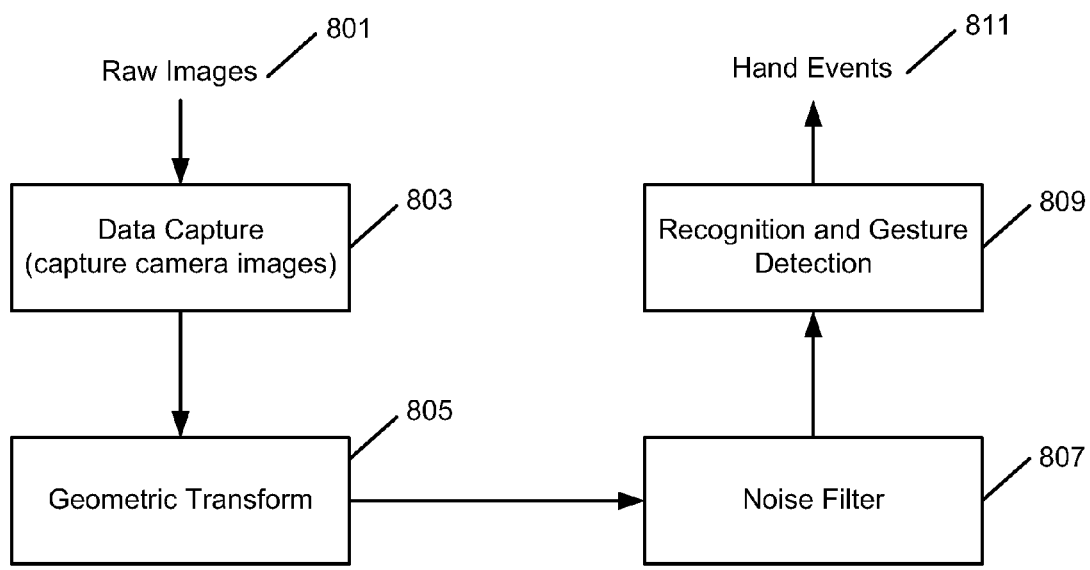
FIG. 8 is an illustration of an example gestural interface system.

FIG. 8 is an illustration of an example gestural interface system 800 that may be implemented using the systems and methods described herein. The gestural interface system 800 may turn a user's hand motions into operating system 115 input events such as mouse movements or clicks. The gestural interface system 800 may comprise some number of cameras or photogrammetric sensors, and may include software to analyze images captured from the cameras. Because such a system 800 functions as a user input device, gesture events recognized by the system 800 may be multiplexed across applications by the operating system 115 of the computing device 110. The system 800 may include several processing stages including a data capture stage 803, a geometric transform stage 805, a noise filter stage 807, and a recognition and gesture detection stage 809. More or fewer stages may be supported.

During the data capture stage 803, raw images 801 may be captured from the cameras connected to the computing device 110. For example, the raw images 801 may captured by the computing device 110 from a camera connected to the computing device 110 by USB. This stage may be performed by the CPU 111.

During the geometric transform stage 805, one or more geometric transformations may be applied to the raw images 801 captured at the data capture stage 803. For example, the geometric transformations may be used transform raw images 801 from multiple camera perspectives to a single point cloud in a coordinate system of a screen or of a user. The geometric transform stage 805 may be performed by one or more of the accelerators 120a-c in an implementation.

During the noise filter stage 807, one or more noise filters may be applied to the output of the geometric transform stage 805. The noise filter stage 807 may be performed by the one or more of the accelerators 120a-c. The noise filter stage 807 and the geometric transform stage 805 may be executed in parallel.

During the recognition and gesture detection stage 809, one or more recognition and gesture detection algorithms may be applied to the outputs of the geometric transform stage 805 and the noise filter stage 807 to detect gestures in the raw images 801. The recognition and gesture stage 809 may be performed by the CPU 111, and may provide hand events 811 as an output to the operating system 115.

Given the four stages described above, the gestural interface system 800 may be composed using pipes as follows: Data Capture stage 803|Geometric Transform stage 805|Noise Filter stage 807|Recognition and Gesture Detection stage 809.

This above described design is modular (making its components easily reusable) and relies on familiar OS-level abstractions to communicate between stages in the pipeline. Inherent data-parallelism in the geometric transform stage 805 and the noise filter stage 807 are well-suited for parallel execution the accelerators 120a-c. If the system 800 uses multiple cameras with high data rates and large image sizes, these algorithms can easily saturate a modern chip multi-processor (CMP). An accelerator based implementation realizes frame rates above a real-time rate, and may use minimal CPU 111 resources because nearly all of the work is done on the accelerators 120a-c.

Figure 9:
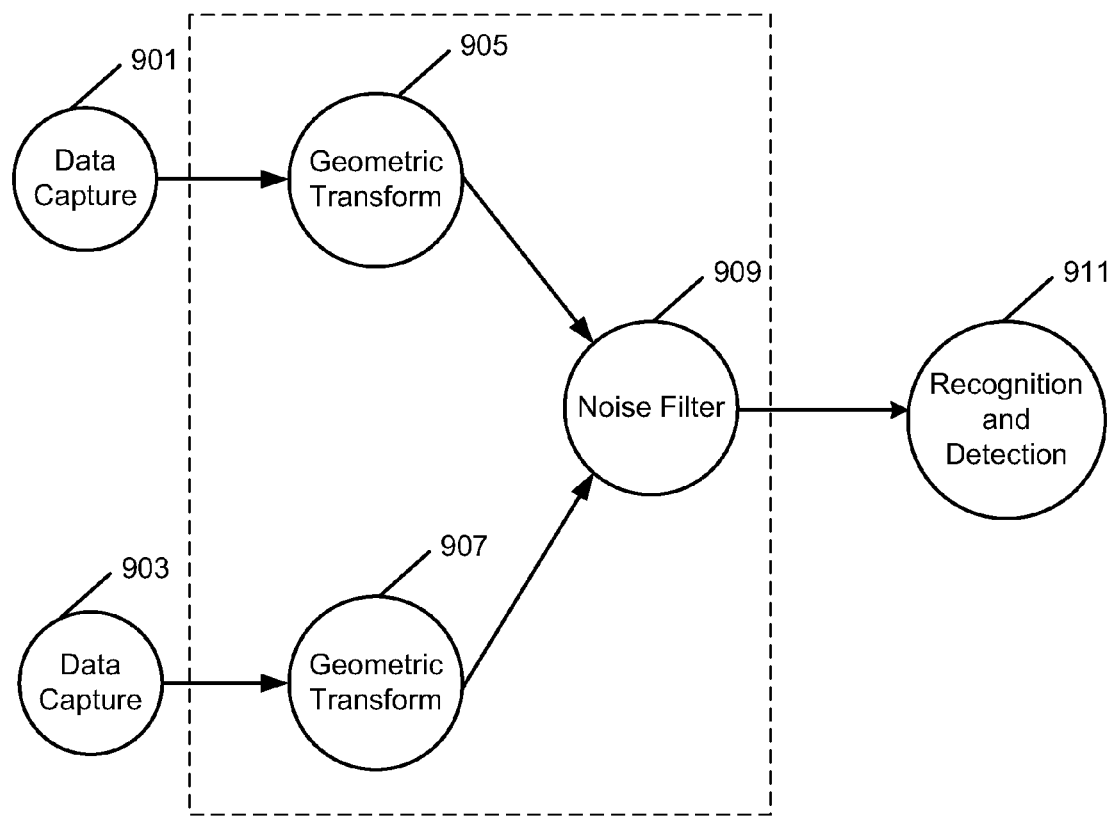
FIG. 9 is an illustration of an example graph representing a gestural interface system.

FIG. 9 is an illustration of a graph 900 representing the gestural interface system 800. The graph 900 includes nodes 901 and 903 that represent the data capture stage 803. In the example shown, the system 800 may have two cameras, thus each of the nodes 901 and 903 represents capturing input from a camera. The graph 900 further includes nodes 905 and 907 that represent the geometric transform stages 805, a node 909 that represents the noise filter stage 807, and a node 911 that represents the recognition and detection stage 809. The nodes that are outside of the hashed box are associated with processes on the CPU 111, and the nodes that are inside of the hashed box are associated with accelerator tasks on one or more of the accelerators 120a-c.

The graph 900 may be used by the datablock manager 310 of the accelerator interface 140 to eliminate unnecessary communication between the CPU 111 and the accelerators 120a-c. For example, the edge connecting the node 901 and the node 905, and the edge connecting the node 903 and the node 907, can be used by the datablock manager 310 to establish a direct data transfer from the cameras to the memories of the accelerators 120a-c that execute the accelerator tasks associated with the nodes 905 and 907. Data transfer in this manner may eliminate double buffering between the memories 130a-c of the accelerators 120a-c and the memory 105 of the CPU 111.

The graph 900 may similarly be used to eliminate unnecessary copying of data between accelerators 120a-c. For example, based on the edge between the node 905 and node 909, the scheduler 320 may recognize that the accelerator task associated with the node 909 uses data output by the accelerator task associated with the node 905, and may schedule the accelerator task associated with node 909 to execute on the same accelerator 120a-c that executed the accelerator task associated with the node 905. As a result, no data may be copied between the accelerators 120a-c.

As may be appreciated, the graph 900 may also be used to minimize the involvement of user/application-level code with respect to accelerator 120a-c activities. For example, the arrival of data from the node 901 (i.e., camera data) at a data input of the node 905 may be used to trigger the execution of the accelerator task associated with the node 905 using interrupt handlers in the operating system 115, rather than waiting for a host-based program to be scheduled to start the accelerator processing.

The graph 900 may also express concurrency that the scheduler 320 may exploit without the programmer to writing code with explicit threads. For example, as illustrated in the graph 900, when two accelerators are present, the accelerator tasks associated with the nodes 905 and 907 (i.e., the geometric transform state 905) may be executed in parallel by the scheduler 320.

Figure 10:
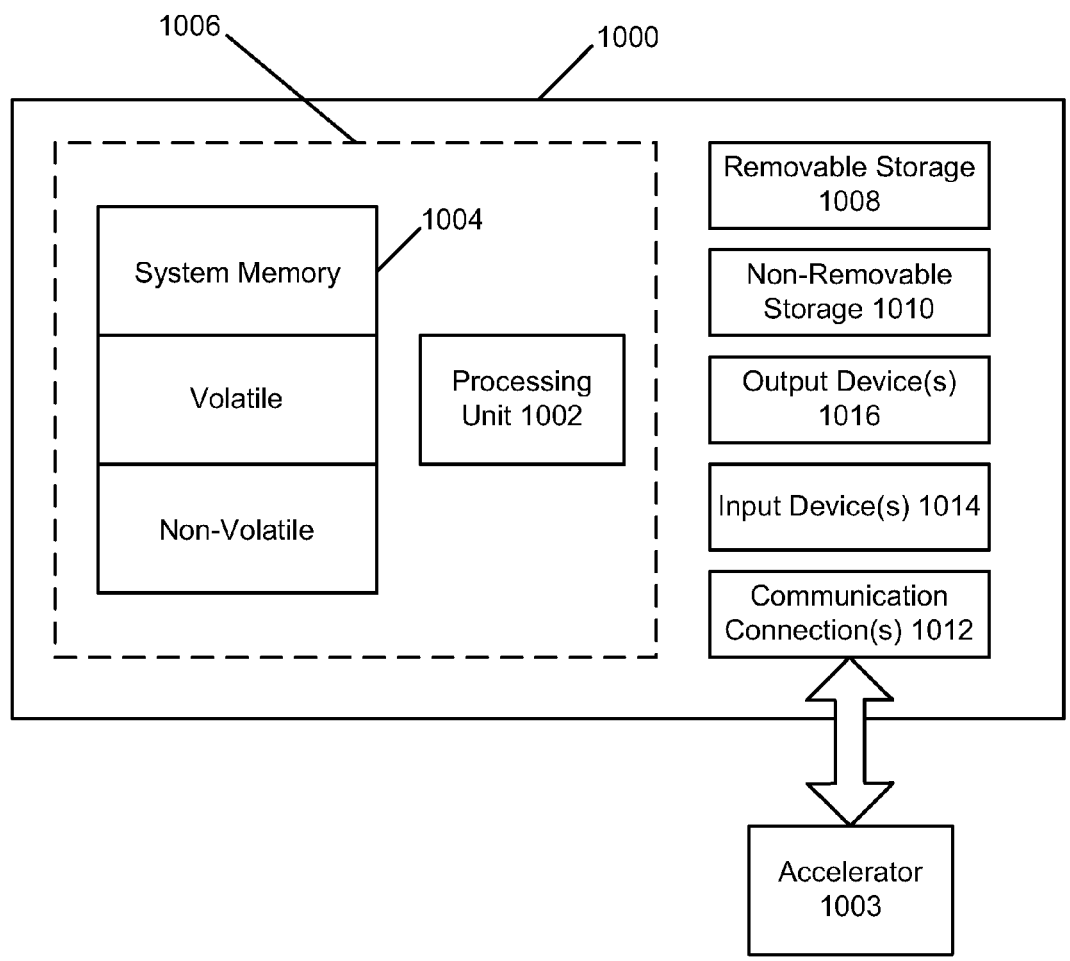
FIG. 10 shows an exemplary computing environment.

FIG. 10 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by computing device 1000 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

The computing device 1000 may further include one or more accelerators 1003. The accelerator 1003 may include a GPU or an FPGA, for example. The accelerator 1003 may communicate with the processing unit 1002 through the communication connection(s) 1012. The accelerator 1003 may have its own memory that is separate from the memory 1004. As described herein, a computing device may include multiple accelerators 1003 where an exemplary method relies on one or more of these accelerators.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example, as well as GPUs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving a plurality of accelerator tasks at a computing device, wherein each accelerator task has an associated set of accelerator parameters, and wherein each accelerator task is associated with a priority that is determined based on a weighted sum of an average wait time associated with the accelerator task and an average run time associated with the accelerator task;
receiving identifiers of a plurality of accelerators at the computing device;
receiving identifiers of one or more available accelerators from the plurality of accelerators at the computing device, wherein an available accelerator is an accelerator from the plurality of accelerators that is not executing an accelerator task;
receiving identifiers of a plurality of datablocks at the computing device, wherein each of the plurality of datablocks identifies data located at buffers on one or more of the available accelerators;
determining a ready accelerator task from the plurality of accelerator tasks by the computing device, wherein the ready accelerator task is an accelerator task from the plurality of accelerator tasks that is not waiting for a datablock of the plurality of datablocks to be updated or for data to be generated by another accelerator task;
determining one or more accelerators from the identified one or more available accelerators that supports the set of accelerator parameters associated with the determined ready accelerator task by the computing device;
determining datablocks of the plurality of datablocks that are associated with the ready accelerator task by the computing device;
selecting one of the determined one or more accelerators that uses a least amount of data transfer for the determined datablocks that are associated with the ready accelerator task;
providing the ready accelerator task to the selected one of the determined one or more accelerators by the computing device;
directly copying the data identified by one or more of the determined datablocks from the buffers on the one or more of the available accelerators to a buffer on the selected one of the determined one or more accelerators by the computing device;
scheduling execution of the ready accelerator task on the selected one of the determined one or more accelerators by the computing device; and
receiving at least one result from the selected one of the one or more determined accelerators by an operating system of the computing device.

2. The method of claim 1, wherein copying the data identified by one or more of the determined data blocks to the buffer comprises determining a version of the data at the buffer on the selected one of the determined accelerators, and copying the data to the buffer only if the version is not a most recent version.

3. The method of claim 1, further comprising maintaining a queue of ready accelerator tasks from the plurality of accelerator tasks, and wherein determining a ready accelerator task from the plurality of accelerator tasks comprises determining a first ready accelerator task in the queue.

4. The method of claim 1, wherein determining a ready accelerator task comprises determining a ready accelerator task with a greatest associated priority.

5. The method of claim 1, wherein the associated priority for an accelerator task is further determined based on a current wait time associated with the accelerator task, and a priority corresponding to a process that is associated with the accelerator task.

6. The method of claim 1, wherein each of the accelerators is associated with a strength.

7. The method of claim 6, wherein the strength associated with an accelerator is determined based on one or more of a number of cores associated with the accelerator, a core clock speed associated with the accelerator, or a clock speed associated with a memory associated with the accelerator.

8. The method of claim 1, wherein the plurality of accelerator tasks is represented by a graph with a node corresponding to each accelerator task, and a plurality of edges with each edge corresponding to a data flow among the plurality of accelerator tasks.

9. The method of claim 1, wherein an accelerator task has an affinity towards one or more of the available accelerators.

10. The method of claim 1, wherein directly copying the data comprises directly copying the data without buffering or copying the data on a memory associated with the computing device.

11. A method comprising:
receiving a plurality of accelerator tasks at a computing device, wherein each accelerator task comprises at least one data output and at least one data input, and wherein each accelerator task is associated with a priority that is determined based on a weighted sum of an average wait time associated with the accelerator task and an average run time associated with the accelerator task;
generating a graph based on the accelerator tasks by the computing device, wherein the graph comprises a node for each of the accelerator tasks, and edges between pairs of nodes corresponding to accelerator task pairs where a data output of a first accelerator task in the pair is a data input of a second accelerator task in the pair;
receiving identifiers of a plurality of accelerators at the computing device;
receiving data on an inbound edge of the graph, wherein the data is associated with one or more datablocks;
scheduling the execution of the plurality of accelerator tasks on the identified plurality of accelerators according to the generated graph, the priority associated with each accelerator task, a number of hardware threads used to execute each accelerator task by the computing device, and to minimize an amount of data that is copied between the identified plurality of accelerators and the computing device; and
providing at least one result of the execution of the plurality of accelerator tasks to an operating system of the computing device.

12. The method of claim 11, wherein the plurality of accelerators comprise graphics processing units or field-programmable gate arrays.

13. The method of claim 11, wherein one or more of the plurality of accelerator tasks are associated with one or more stages of a gestural interface system.

14. The method of claim 11, wherein the scheduling is one of first-available, FIFO, priority, or data-aware scheduling.

15. The method of claim 11, wherein each of the plurality of accelerator tasks has an associated set of accelerator parameters, and the execution of the plurality of accelerator tasks on the identified plurality of accelerators is further scheduled according to the set of accelerator parameters associated with each of the plurality of accelerator tasks.

16. A system comprising:
at least one computing device;
a plurality of accelerators; and
an application programming interface adapted to:
determine a ready accelerator task from a plurality of accelerator tasks, wherein each accelerator task has an associated set of accelerator parameters, wherein a ready accelerator task is an accelerator task from the plurality of accelerator tasks that is not waiting for a datablock of a plurality of datablocks to be updated or for data to be generated by another accelerator task, and wherein each accelerator task has a priority that is determined based on a weighted sum of an average wait time associated with the accelerator task and an average run time associated with the accelerator task;
determine datablocks of the plurality of datablocks that are associated with the ready accelerator task, wherein each of the plurality of datablocks identifies data located at buffers on one or more of the accelerators;
determine accelerators of the plurality of accelerators that support the set of accelerator parameters associated with the determined ready accelerator task;
select one of the determined accelerators that uses a least amount of data transfer for the determined datablocks that are associated with the ready accelerator task;
directly copy the data identified by one or more of the determined datablocks from the buffers on the one or more of the accelerators to a buffer on the selected accelerator;
schedule execution the ready accelerator task on the selected accelerator; and
provide result of the execution of the ready accelerator task to an operating system of the computing device.

17. The system of claim 16, wherein the plurality of accelerators comprise graphics processing units or field-programmable gate arrays.

18. The system of claim 16, wherein each of the plurality of accelerators is associated with a strength.

19. The system of claim 18, wherein the strength associated with an accelerator is calculated based on a clock speed associated with a memory associated with the accelerator.

20. The system of claim 16, wherein the application programming interface adapted to directly copy the data comprises the application programming interface adapted to directly copy the data without buffering or copying the data on a memory associated with the at least one computing device.

* * * * *